United States Patent [19]

Weiss

[11] Patent Number: 5,048,776
[45] Date of Patent: Sep. 17, 1991

[54] PIPE CLAMP

[76] Inventor: Jacques L. Weiss, 48, rue du 19 Janvier, 92380 Garches, France

[21] Appl. No.: 469,147

[22] Filed: Jan. 24, 1990

[51] Int. Cl.⁵ .............................. F16L 3/08
[52] U.S. Cl. .................. 248/74.1; 248/74.4; 285/420; 24/273; 24/20 CW
[58] Field of Search ........... 24/270, 271, 273, 20 CW, 24/20 EE, 20 TT, 23 EE, 20 R; 285/243, 252, 365, 407, 420

[56] References Cited

U.S. PATENT DOCUMENTS

| 1,631,396 | 6/1927 | Beegle | 24/20 CW |
| 3,994,051 | 11/1976 | Serretti, Jr. | 24/273 |
| 4,773,129 | 9/1988 | Muhr | 24/20 CWX |

Primary Examiner—Randolph A. Reese
Assistant Examiner—Heather Chun
Attorney, Agent, or Firm—Christie, Parker & Hale

[57] ABSTRACT

The clamp comprises at least one metal circular strip enclosing a pipe and having two ends hooking into each other. One of the ends is provided with a double elbow 6, 7 first forming an outwardly pointing part 8 and then a rearwardly pointing part 9. The other strip end 14 extends over a bent-back part 9 and these two overlapping parts are provided with a mutual hook-up arrangement 10 and coinciding apertures 12, 17 to pass a tool bending the bent-back part 9 around the elbow 6 to tighten the clamp onto the pipe.

3 Claims, 1 Drawing Sheet

U.S. Patent  Sep. 17, 1991  5,048,776
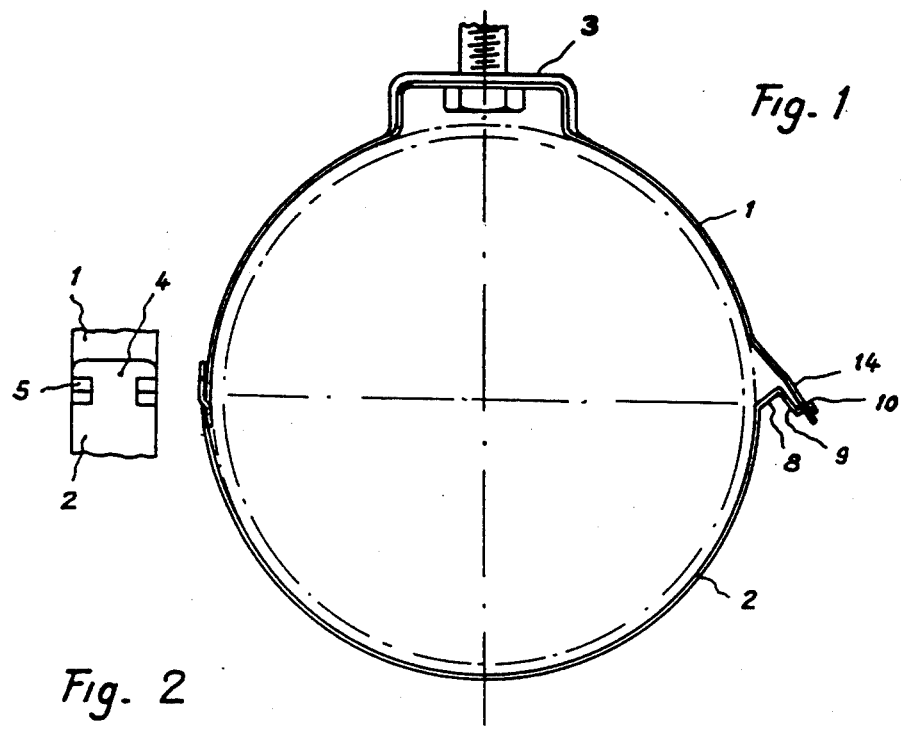
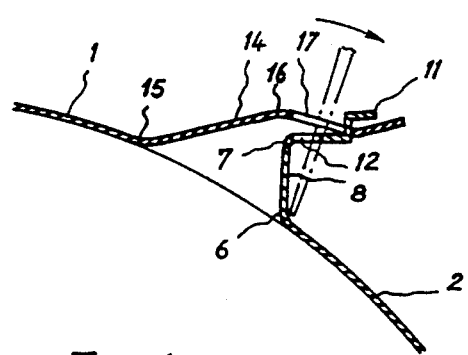
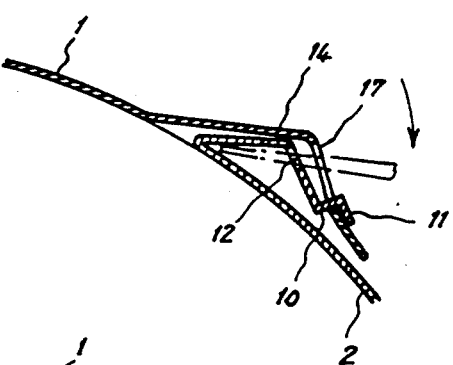
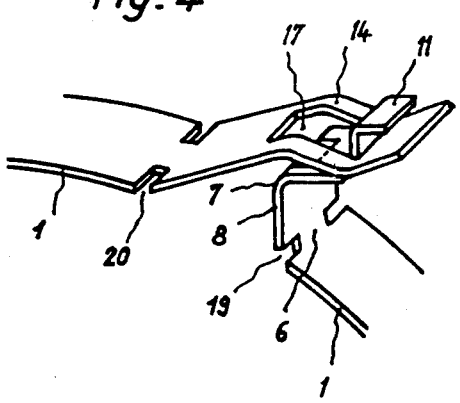
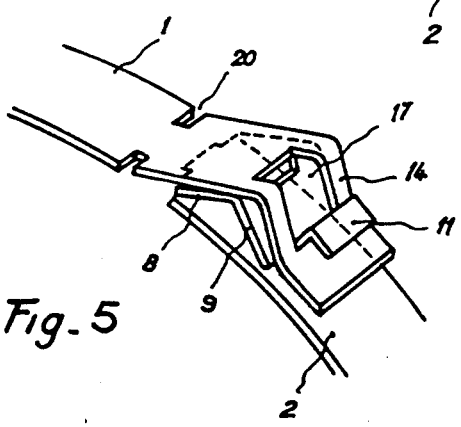

PIPE CLAMP

FIELD OF THE INVENTION

The invention concerns pipe clamps to fasten or support pipes and the like to walls and partitions.

BACKGROUND AND SUMMARY OF THE INVENTION

As a rule such clamps consist of two metal half collars one of which is rigidly joined to a wall fastener (for instance by a bolt) and the other one of which is connected to the first by clamping screws passing through radial lugs in the half collars.

The object of the invention is to simplify clamps of this kind, in particular their tightening to the pipe, in order to achieve more convenient and speedy on-site installation. For that purpose the invention relates to a clamp comprising at least one circular metal strip girding the pipe with two ends hooking into each other. This clamp is characterized in that one of the ends has a double elbow forming first one part pointing outside and then a part pointing to the rear, whereas the other strip end extends above the back-folded part, the two overlapping parts being provided with mutual hooking means and with matching openings to pass a tool with which the first end can be folded to the rear around its first elbow to tighten the clamp by means of the tension subsequently exerted on the overlapping end.

The clamp may consist of two half collars and in that event assembly is carried by merely hooking up the corresponding ends of the half collars and by the aforementioned hook-up and tightening means, whereby it is possible to assemble the clamp around the pipe without the need to handle moving and detachable parts that the operator might drop.

BRIEF DESCRIPTION OF THE DRAWINGS

An illustrative embodiment of such a clamp is described below in relation to the attached drawings.

FIG. 1 shows the clamp before being tightened on the pipe;

FIG. 2 is a cross sectional view of a mutual hook-up and tightening means aooordinq to the present invention before being tightened on the pipe;

FIG. 3 is a cross sectional view of the means of FIG. 2 after being tightened on the pipe;

FIG. 4 is perspective view of the means of FIG. 2; and

FIG. 5 is a perspective view of the means of FIG. 3.

DETAILED DESCRIPTION OF THE INVENTION

This clamp consists of two semi-circular half collars 1 and 2, one of which is provided with a bridge 3 that is perforated to allow a bolt tor fastening the clamp to a wall. On one side, the matching ends of the half collars hook into each other by means of the T-shaped cut-out 4 in the half collar 2 engaging backfolded lugs 5 cut out of the half collar 1. This hook-up system is known per se; its advantage is its simplicity and its lack of moving parts. One the other side, the half collars are linked to each other by the below-described hook-up and tightening means.

The half collar 2 comprises one end in the form of a double elbow 6 and 7 first subtending a nearly radially outward pointing part 8 and then a rearward part 9. This part 9 ends in a lug 10 of lesser width bent outward and ending in a flange 11. A narrow transverse slit 12 passes through part 9 near the second elbow 7.

The end of the other half collar 1 comprises a part extending sufficiently above part 9 of the half collar 2. This end may be slightly bent at 15 and 16 so that the half collar body shall remain resting against the pipe, allowing part 14 to overlap part 9. Opposite the part 9, the end 14 comprises an aperture 17 which on one hand allows passing the lug 10 to mutually hook up the two half collars and which on the other hand comes into coincidence with the slit 12 of part 9. Once hook-up has been effected by passing the lug 10 into the aperture 17 (which, considering the comparative flexibility of the half collars is very easy), a flat tool shall be inserted into the slit 12, for instance a screwdriver, as far as the first elbow 6, and thereupon, by lever action, the part 8 of the half collar 2 is bent back around the elbow 6, whereby a traction is exerted on the end 14 by the hook-up lug 10 and the overall clamp is tightened on the pipe. When tightening is finished, the two ends of the half collars are tightly applied against each other and project only slightly outward, the acute angle being formed now by the elbow 6 offering good opposition to the clamps's tendency to loosen.

In order to make deformation of the folded parts easier during tightening, in particular as regards clamps of comparatively large diameters entailing the use of fairly thick metal strips, the cross-section of the folding elbows 6 and 15 may be reduced by any suitable means, for instance resorting to clearances 19, 20. By selecting a suitably malleable metal for the strip, a clamp can be made which shall be both disassemblable and ready for new use.

The disclosure of French Patent Application No. 88 10073, filed July 26, 1988 is hereby incorporated by reference.

What is claimed is:

1. A pipe clamp comprising:
a substantially circular metal strip having a first end and a second end for enclosing a pipe so that the first and second ends meet;
a double elbow on the first end having a first part extending substantially radially and a second part extending from the first part substantially tangentially and away from the second end;
a third part on the second end extending over the first and second parts to substantially overlap the second part;
means for hooking the second part up with the third part; and
an aperture on the second part and an aperture on the third part, both for receiving a tool for drawing the second and third parts away from the second end thereby tightening the clamp.

2. Clamp of claim 1 wherein the hooking up means comprises a bent back lug on one of the parts adapted to enter an opening in the other one of the parts.

3. Clamp of claim 1 wherein the double elbow has a reduced cross section near the first part to facilitate bending when the clamp is tightened.

* * * * *

UNITED STATES PATENT AND TRADEMARK OFFICE
CERTIFICATE OF CORRECTION

PATENT NO. : 5,048,776

DATED : September 17, 1991

INVENTOR(S) : Jacques L. Weiss

It is certified that error appears in the above-identified patent and that said Letters Patent is hereby corrected as shown below:

Column 1, line 45, change "aooording" to -- according --.

Column 1, line 57, after "bolt" change "tor" to -- for --.

Signed and Sealed this

Twenty-third Day of March, 1993

Attest:

STEPHEN G. KUNIN

*Attesting Officer*      *Acting Commissioner of Patents and Trademarks*